(12) United States Patent
Curtis et al.

(10) Patent No.: US 10,373,404 B2
(45) Date of Patent: *Aug. 6, 2019

(54) AIRCRAFT FLIGHT DATA MONITORING AND REPORTING SYSTEM AND USE THEREOF

(71) Applicant: LATITUDE TECHNOLOGIES CORPORATION, Victoria (CA)

(72) Inventors: Timothy Curtis, Brentwood Bay (CA); Mark Insley, Victoria (CA); David Martin, Victoria (CA)

(73) Assignee: Latitude Technologies Corporation (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,290

(22) Filed: Sep. 11, 2018

(65) Prior Publication Data

US 2019/0005744 A1    Jan. 3, 2019

Related U.S. Application Data

(63) Continuation-in-part of application No. 14/761,923, filed as application No. PCT/IB2013/053176 on Apr. 22, 2013, now Pat. No. 10,075,228.

(51) Int. Cl.
*G07C 5/00* (2006.01)
*G08G 5/00* (2006.01)
(Continued)

(52) U.S. Cl.
CPC ............ *G07C 5/008* (2013.01); *G07C 5/085* (2013.01); *G07C 5/0808* (2013.01);
(Continued)

(58) Field of Classification Search
CPC ... B64D 2045/0085; B64D 45/00; B64F 5/60; H04B 7/155; H04L 41/5058; H04L 61/1511; H04L 61/2007; H04L 67/10; H04L 67/12; H04L 67/16; H04W 48/16; H04W 4/046; H04W 4/40; H04W 4/50; H04W 88/08; H04W 84/06; H04W 84/12; B60R 16/0215; G07C 5/008; G07C 5/085;
(Continued)

(56) References Cited

U.S. PATENT DOCUMENTS 5,141,307 A    8/1992    Bennett
5,890,079 A    3/1999    Levine
(Continued)

OTHER PUBLICATIONS

WIPO, Canadian International Searching Authority, International Search Report and Written Opinion dated Jan. 7, 2014, International Patent Application No. PCT/IB2013/053176, 10 Pages.

*Primary Examiner* — Tan H Trinh
(74) *Attorney, Agent, or Firm* — Marc Baumgartner; Baumgartner Patent Law

(57) ABSTRACT

An aircraft flight data monitoring and reporting system is provided. The system comprises: an onboard flight data recording and reporting unit; a remote flight data monitoring storage and analysis unit; a wireless communication link; and a network, the wireless communication link and network for communications between the aircraft flight data monitoring and reporting system and the flight data monitoring, storage and analysis unit.

18 Claims, 9 Drawing Sheets

(51) Int. Cl.
*G07C 5/08* (2006.01)
*H04W 84/12* (2009.01)
*H04W 84/06* (2009.01)

(52) U.S. Cl.
CPC ......... *G08G 5/0013* (2013.01); *G08G 5/0026* (2013.01); *G08G 5/0052* (2013.01); *H04W 84/06* (2013.01); *H04W 84/12* (2013.01)

(58) Field of Classification Search
CPC .. G08G 5/0013; G08G 5/0026; G08G 5/0052; H01R 2105/00; H01R 2201/26; H01R 25/162; H01R 4/30; H02G 5/002
USPC .......... 455/431, 422, 456, 427, 12.1, 430, 9, 455/297, 66, 41.2, 41.1; 370/315, 310, 370/328, 945, 395; 340/945, 461, 452, 340/961, 978, 425.5
See application file for complete search history.

(56) References Cited

U.S. PATENT DOCUMENTS

| | | | |
|---|---|---|---|
| 6,181,990 B1* | 1/2001 | Grabowsky | B64D 47/00 701/14 |
| 6,745,010 B2* | 6/2004 | Wright | G05D 1/0055 340/12.5 |
| 7,028,304 B1* | 4/2006 | Weinberger | G06Q 10/10 709/227 |
| 7,181,478 B1 | 2/2007 | Korson | |
| 7,848,698 B2 | 12/2010 | Batcheller | |
| 8,509,966 B2 | 8/2013 | Coulmeau | |
| 8,509,968 B1* | 8/2013 | Saccone | G05D 1/0005 701/3 |
| 10,075,228 B2* | 9/2018 | Klippert | H04W 4/046 |
| 2003/0093187 A1* | 5/2003 | Walker | B64C 13/20 701/1 |
| 2004/0176887 A1* | 9/2004 | Kent | G05B 23/0221 701/29.5 |
| 2004/0204801 A1 | 10/2004 | Steenberge | |
| 2004/0260777 A1 | 12/2004 | Kolb | |
| 2005/0149238 A1 | 7/2005 | Stefani | |
| 2005/0228558 A1 | 10/2005 | Valette | |
| 2006/0206246 A1* | 9/2006 | Walker | G06Q 10/00 701/16 |
| 2007/0042772 A1* | 2/2007 | Salkini | G01S 5/02 455/431 |
| 2007/0081672 A1 | 4/2007 | Li | |
| 2009/0058635 A1 | 3/2009 | Lalonde | |
| 2009/0298461 A1 | 12/2009 | O'Reilly | |
| 2009/0305708 A1 | 12/2009 | Matsui | |
| 2010/0285825 A1 | 11/2010 | Doppler | |
| 2011/0103293 A1 | 5/2011 | Gale | |
| 2011/0144875 A1 | 6/2011 | Rado | |
| 2012/0218127 A1 | 8/2012 | Kroen | |
| 2013/0083960 A1* | 4/2013 | Kostrzewski | H05K 7/1427 382/103 |
| 2013/0126679 A1* | 5/2013 | Estkowski | G08G 5/0013 244/190 |
| 2013/0145153 A1 | 6/2013 | Brown | |
| 2013/0324034 A1 | 12/2013 | Klein | |
| 2014/0047107 A1 | 2/2014 | Maturana | |
| 2014/0053628 A1* | 2/2014 | Lockhart | G01N 25/58 73/25.04 |
| 2014/0304454 A1 | 10/2014 | Ellis | |
| 2015/0279218 A1 | 10/2015 | Irrgang | |
| 2015/0363981 A1* | 12/2015 | Ziarno | H04B 1/3822 701/101 |
| 2017/0158346 A1 | 6/2017 | Lyons | |

* cited by examiner ary patent applications are incorporated herein by reference in their entirety.

AIRCRAFT FLIGHT DATA MONITORING AND REPORTING SYSTEM AND USE THEREOF

CROSS-REFERENCE TO RELATED APPLICATIONS

The present invention is a continuation-in-part application of U.S. patent application Ser. No. 14/761,923, filed Jul. 17, 2015, now U.S. Pat. No. 10,075,228, issued Sep. 11, 2018, which is a U.S. National Stage application of PCT/IB2013/053176, filed Apr. 22, 2013. The above-identified priority patent applications are incorporated herein by reference in their entirety.

FIELD

The present technology relates to systems and methods for collecting, analyzing and reporting flight data for both fixed wing and rotary wing aircraft. More specifically, the technology relates to wireless data transfer and heuristic triggers to analyze the data in real time. A flight data recording and reporting unit, which may be modular or may be a single unit is central to the system.

BACKGROUND

Tracking and reporting aircraft flights and anomalies therein is extremely important in the aircraft industry, whether for commercial airlines, or specialized applications such as helicopter logging and firefighting. In the earlier days, flight data recorders were used to determine what went wrong in a flight after the fact. Beacons were used to locate a downed aircraft.

There are a large number of functions that are desirable to have in an aircraft data recording and reporting system. These include capturing occurrences that take place during flight using Air Data and Attitude Heading and Reference Systems (ADHRS), Quick Access Recorder (QAR) and Flight Data Recorder (FDR) and FSM heuristics monitoring. Because of the large number of functions, there are a relatively large number of components in the system that must communicate effectively with one another. These require space, and must be coordinated with one another.

Accessing the data has also provided challenges. Generally, a maintenance person would manually download the FDR data from the aircraft using a QAR. Then manually transfer the memory media to an observation and analysis station.

Later, as it became apparent that more data could be available and would be of value, data were transmitted from the aircraft after it landed. For example, U.S. Pat. No. 6,181,990 discloses an aircraft data transmission system used with an aircraft having a data acquisition unit. The system includes a communications unit located in the aircraft and in communication with the data acquisition unit. The system also includes a cellular infrastructure in communication with the data communications unit after the aircraft has landed. The system further includes a data reception unit in communication with the cellular infrastructure.

More recently, aircraft tracking methods and systems have been developed. For example, US Patent Application 20040204801 discloses a safety and security system. The system includes an aircraft subsystem, a ground subsystem in communication with the aircraft subsystem via a wireless communication link, and an external system in communication with the ground subsystem via a second communication link. The aircraft subsystem includes a comparator module for comparing flight data with expected data, and a triggering module for triggering transmission of selected data when the flight data deviate from the expected data. The ground subsystem includes an analyzer module for analyzing the selected data transmitted from the aircraft. One of the ground subsystem and the external system includes a correlation module for correlating the selected data transmitted from the aircraft with information accessible by the external system. This approach is limited by the communication links that it uses.

In order to fully exploit the communication links that are currently available, the Internet Protocol (IP) address that will be assigned either needs to be known, or the requirement to know the IP address needs to be removed. Unfortunately, when mobile devices connect to or create a hotspot with an indeterminate IP address, addresses in the 192.168.0 class C subnet are usually used, but there is no documentation that confirms that is the only subnet it will use. Even if the subnet is known, the IP address dynamically assigned to the mobile device will not be known. Similarly, when a flight data recording and reporting unit connects, the IP address will not be known beforehand. Knowing what IP address will be assigned to the mobile base station ahead of time simply has not been feasible. Hence there is a need to be able to find a service on a network by service name without the client having to know the IP address or port number in advance.

A system for transferring data from flight data recording and reporting units is required that provides for auto-discovery and auto-connect between the flight data recording and reporting units and base stations, flight data monitoring storage and analysis units and the like. Preferably, the communications are bi-directional, allowing for reporting back to the aircraft or to remote locations. Autonomous reporting would reduce the reliance on human intervention.

SUMMARY

The present technology provides a system that increases the flexibility and capabilities of an aircraft flight data monitoring and reporting system. A flight data recording and reporting unit is central to the system.

In one embodiment, an aircraft flight data monitoring and analysis system is provided, the system comprising: an onboard flight data recording and reporting unit, which includes a central processor and a memory, the memory configured to send instructions to the central processor to analyze a data set and then process the data set by one or more of parsing, filtering, selecting a subset of the data set and manipulating the data set prior to sending the data set or the subset of the data set; at least one signal interfacing device, which may be integrated in the onboard flight data recording and reporting unit or may be separate to and in communication with the onboard flight data recording and reporting unit; a remote flight data monitoring, storage and analysis unit; a handheld device, the handheld device including the software application; a Satcom (satellite communication) link for transfer of data from the onboard flight data recording and reporting unit and the remote data monitoring, storage and analysis unit; and Wi-Fi a network and an internet network, wherein the Wi-Fi and the internet network are for transfer of data to and from the onboard data recording and reporting unit and the remote flight data monitoring, storage and analysis unit.

In the system, the onboard flight data recording and reporting unit may be configured to provide flight data monitoring.

The system may further comprise a base station, which is a software application, the software application configured to copy and cache data from the onboard flight data recording and reporting unit and relay the cached data to the remote flight data monitoring, storage and analysis unit.

In the system, the onboard flight data recording and reporting unit may be further configured to provide onboard, secondary, not-required-for-flight data.

In another embodiment, an onboard flight data recording and reporting unit for use in an aircraft flight data monitoring and analysis system is provided, the unit comprising a central processor and a memory, the central processor comprising a communication protocol and handling methods that operate between it and a communications module to facilitate bi-directional communication between the flight data recording and reporting unit and an aircraft flight data monitoring, storage and reporting system and the memory configured to send instructions to the central processor to analyze a data set and then process the data set by one or more of parsing, filtering, selecting a subset of the data set and manipulating the data set prior to sending the data set or the subset of the data set.

The onboard flight data recording and reporting unit may be configured to provide flight data monitoring.

The onboard flight data recording and reporting unit may further comprise a battery backup, a 3-axis accelerometer, a 3-axis gyroscope, a solid-state compass, pitot pressure sensor, static pressure sensor, differential pressure sensor, a temperature sensor, an inertial measurement unit, a Global Positioning Satellite (GPS) feed or an internal GPS, and an internal real-time clock.

The onboard flight data recording and reporting unit may further comprise Finite State Machine heuristics monitoring and a real time reporting system.

The onboard flight data recording and reporting unit may be further configured to provide onboard, secondary, not-required-for-flight data.

In yet another embodiment, a method of recording and reporting aircraft data is provided, the method comprising:
selecting an onboard flight data recording and reporting unit, which includes a central processor and a memory, the memory configured to send instructions to the processor; selecting at least one signal interfacing device, which may be integrated in the onboard flight data recording and reporting unit or may be separate to and in communication with the onboard flight data recording and reporting unit and is in communication with at least one sensor;
the onboard flight data recording and reporting unit receiving raw data from the at least one signal interfacing device;
the onboard flight data recording and reporting unit recording the raw data;
the onboard flight data recording and reporting unit analyzing the raw data and processing the raw data by one or more of parsing, filtering, selecting a subset of the raw data and manipulating the raw data to provide analyzed and processed data; and
the onboard flight data recording and reporting unit reporting the raw data and the processed data to a remote flight data monitoring, storage and analysis unit.

In the method, the reporting may be autonomous.

The method may further comprise the onboard flight data recording and reporting unit determining an appropriate time for reporting the processed data.

The method may further comprise the onboard flight data recording and reporting unit receiving instructions from the remote flight data monitoring, storage and analysis unit.

The method may further comprise the onboard flight data recording and reporting unit reprocessing the raw data or the processed data in response to the instructions from the remote flight data monitoring, storage and analysis unit.

In the method, the raw data may be flight data.

In the method, the raw data may be aerial fire attack data.

In the method the raw data may be onboard, secondary, not-required-for-flight data.

The method may further comprise the onboard flight data recording and reporting unit communicating with an observation station.

The method may further comprise the observation station providing post mission flight visualization.

FIGURES

DESCRIPTION

Figure 1:
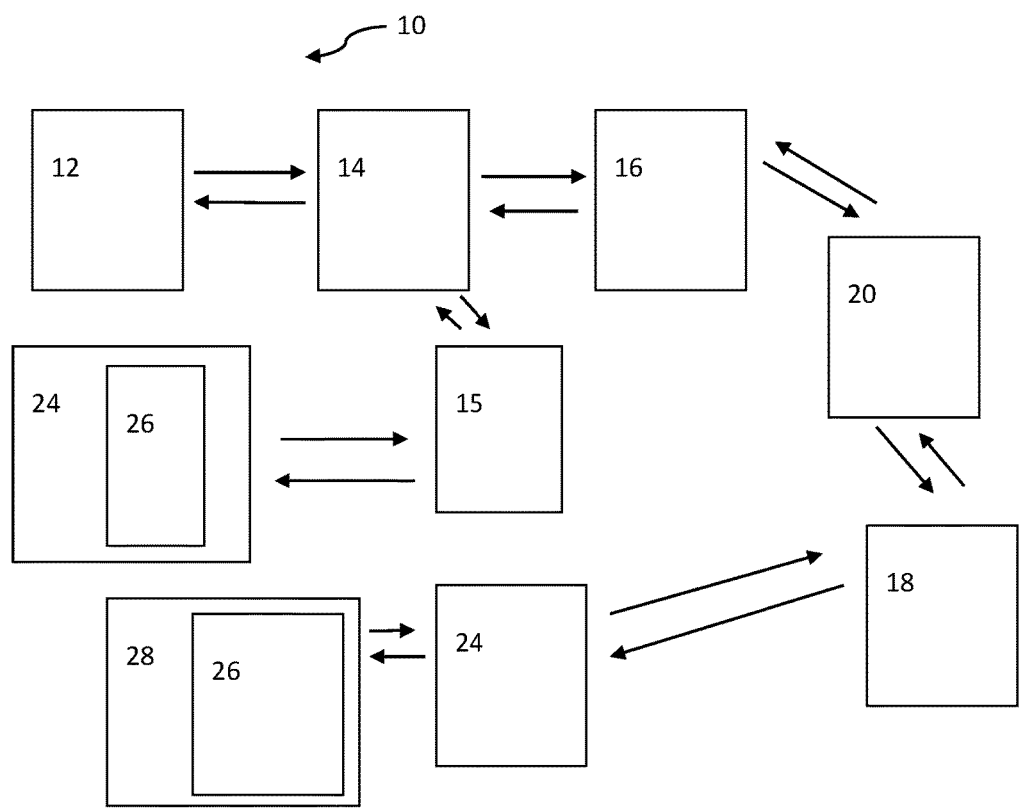
FIG. 1 is a block diagram of an embodiment of the present technology.

Except as otherwise expressly provided, the following rules of interpretation apply to this specification: (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

AP—Access Point; a Wi-Fi device that allows wireless access to a network. It has an SSID.

DNS—Domain Name Service. The network service and protocol to resolve IP addresses from hostnames.

FDM—Flight Data Monitoring

FSM—Finite State Machine

Hotspot—a commonly used term for a wireless access point that connects clients to the Internet. It can link or route using, for example, but not limited to, cellular or Wireless Fidelity (Wi-Fi).

IP—Internet Protocol

LAN—Local Area Network

MAN—Metropolitan Area Network mDNS—Multicast Domain Name Service

Personal Hotspot—a term used to describe a hotspot that can be created by a user. It then functions as a wireless access point that connects a client to the Internet. It can link or route using, for example, but not limited to, cellular or Wi-Fi.

SD—Service Discovery

SSID—Service Set Identifier; a public name for a Wi-Fi network.

TCP—Transmission Control Protocol, a connection-oriented protocol over IP.

UDP—User-Datagram Protocol, a connectionless protocol over IP.

WAN—Wide Area Network.

WLAN—Wireless Local Area Network

WPA2—Wi-Fi Protected Access 2, a security method for Wi-Fi Access Points.

Zero-Configuration—when a service on a network can be found by service name without the client knowing in advance the IP address or port number. Also referred to as auto network discovery.

Cloud refers to cloud computing which is the use of computing resources (hardware and software) that are delivered as a service over a network (typically the Internet).

Mobile device—a mobile device is also known as a hand-held device and includes cell phones and tablets.

Not-required for flight data—in the context of the present technology, not-required for flight data are data from onboard, secondary, not-required-for-flight aircraft electronic systems not critical for an aircraft to get or remain in an airborne state and return safely to the ground. Not-required for flight data does not include data from passenger's personal communication devices.

DETAILED DESCRIPTION

One embodiment of an aircraft flight data monitoring and reporting system, generally referred to as 10 is shown in FIG. 1. The system 10 includes a flight data recording and reporting unit 12 that communicates via a wireless communication link 14. The wireless communication link may be, for example, but not limited to, Wi-Fi, a VHF (Very High Frequency) communication link, an HF (High Frequency) communication link, or a Satcom (satellite communication) link. The wireless communication link 14 transmits to and from a network 16, for example, but not limited to a local area network, a metropolitan area network or a wide area network (LAN, MAN or WAN, respectively) which in turn transmits to and from a fixed base station 18 using a network and a zero-configuration service discoverer 20. The fixed base station 18 then communicates via the internet 24, with a flight data monitoring, storage and analysis unit 26, which is preferably in a cloud 28. In the case where a Satcom 15 link is used, the flight data recording and reporting unit interacts directly, via Satcom 15, with a web-based (internet 24) flight data monitoring, storage and analysis unit 26. Communication is bi-directional.

Figure 2:
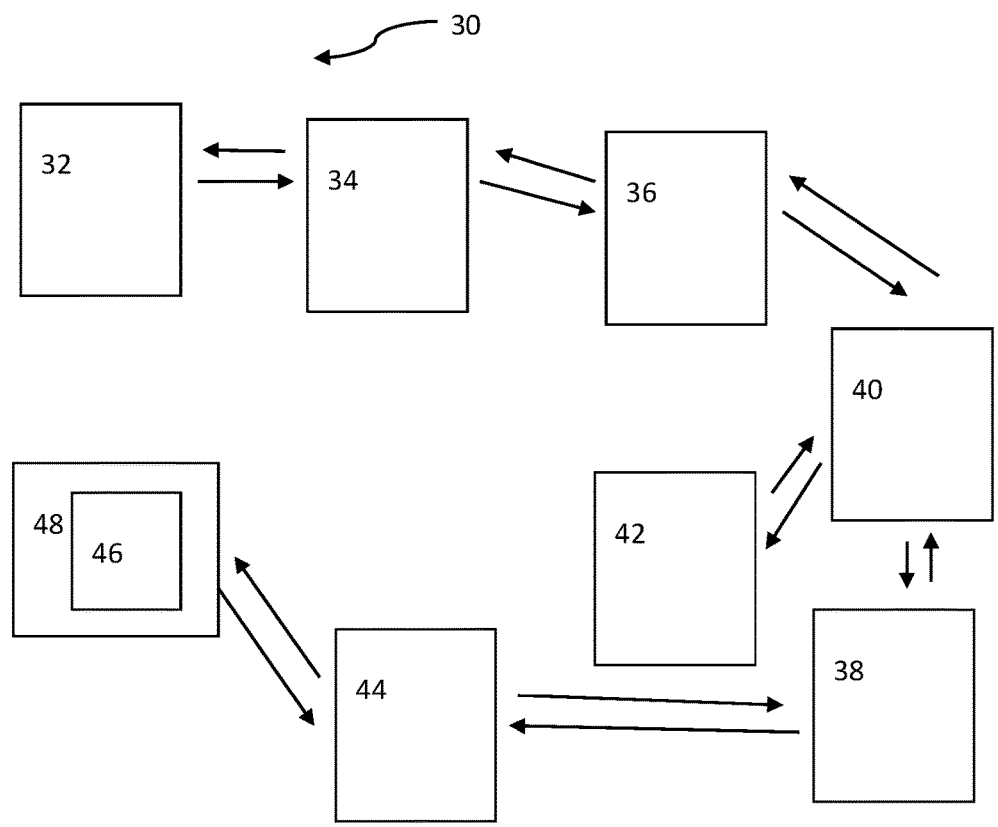
FIG. 2 is a block diagram of another embodiment of the present technology.

Another embodiment of an aircraft flight data monitoring and reporting system, generally referred to as 30, is shown in FIG. 2. The system 30 includes a flight data recording and reporting unit 32 that communicates with a wireless communication link 34. The wireless communication link 34 transmits to a network 36, for example, but not limited to a local area network, a metropolitan area network or a wide area network (LAN, MAN or WAN, respectively) which in turn transmits to a fixed base station 38 and to a mobile or fixed observation station 42 using a network and a zero-configuration service discoverer 40. The fixed base station 38 then communicates via the internet 44 to a flight data monitoring, storage and analysis unit 46, which is preferably in a cloud 48. Communication is bi-directional.

Figure 3:
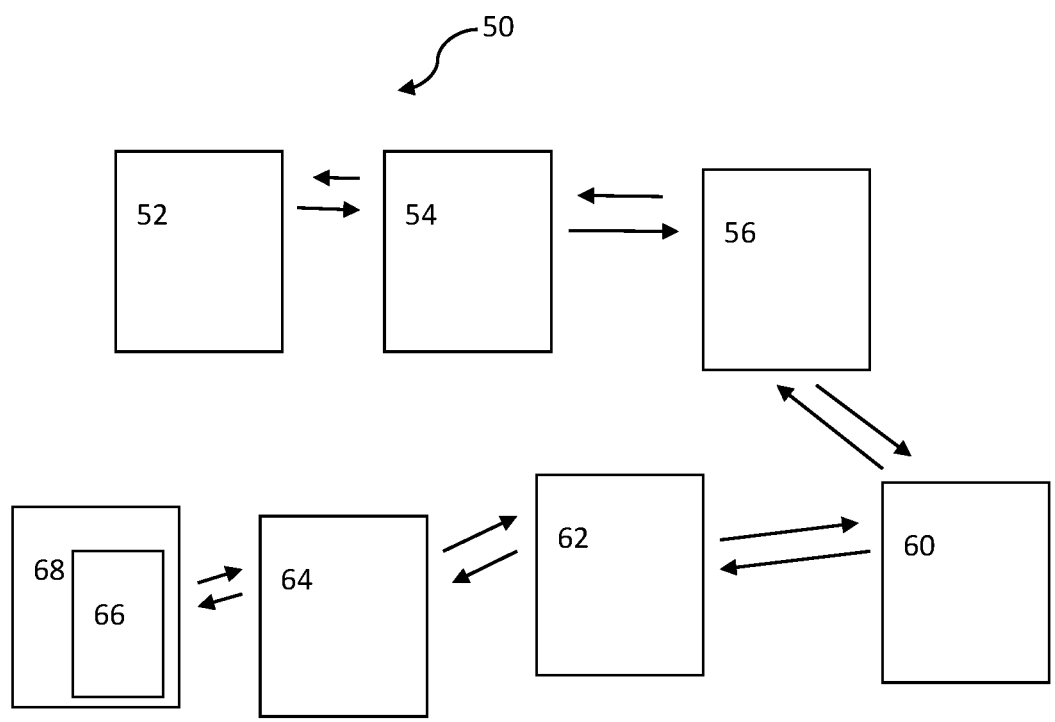
FIG. 3 is a block diagram of another embodiment of the present technology.

Another embodiment of an aircraft flight data monitoring and reporting system, generally referred to as 50, is shown in FIG. 3. The system 50 includes a flight data recording and reporting unit 52 that communicates with a wireless communication link 54. The wireless communication link 54 transmits to a network 56, for example, but not limited to a local area network, a metropolitan area network or a wide area network (LAN, MAN or WAN, respectively) which in turn transmits to a mobile base station 62 using a network via a zero-configuration service discoverer 60. The mobile base station 62 then communicates via the internet 64, to a flight data monitoring, storage and analysis unit 66, which is preferably in a cloud 68. Communication is bi-directional.

Figure 4:
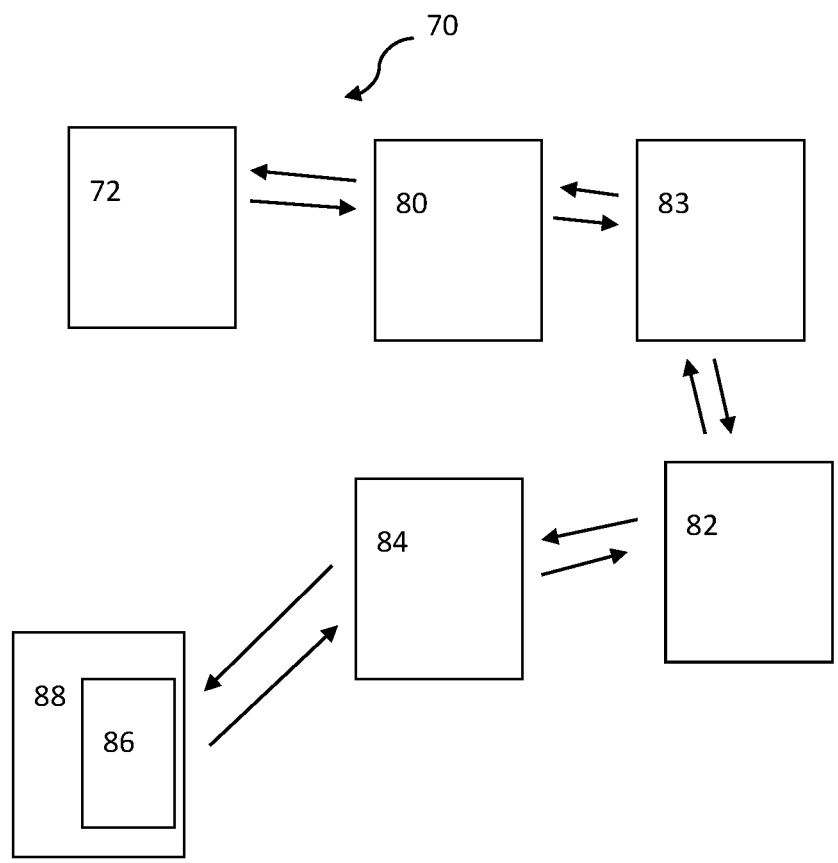
FIG. 4 is a block diagram of another embodiment of the present technology.

Another embodiment of an aircraft flight data monitoring and reporting system, generally referred to as 70, is shown in FIG. 4. The system 70 includes a flight data recording and reporting unit 72 that communicates with a mobile base station 82 with personal hotspot 83 using a zero-configuration service discoverer 80. The mobile base station 82 then communicates via the internet 84, to a flight data monitoring storage and analysis unit 86, which is preferably in a cloud 88. Communication is bi-directional.

Figure 5:
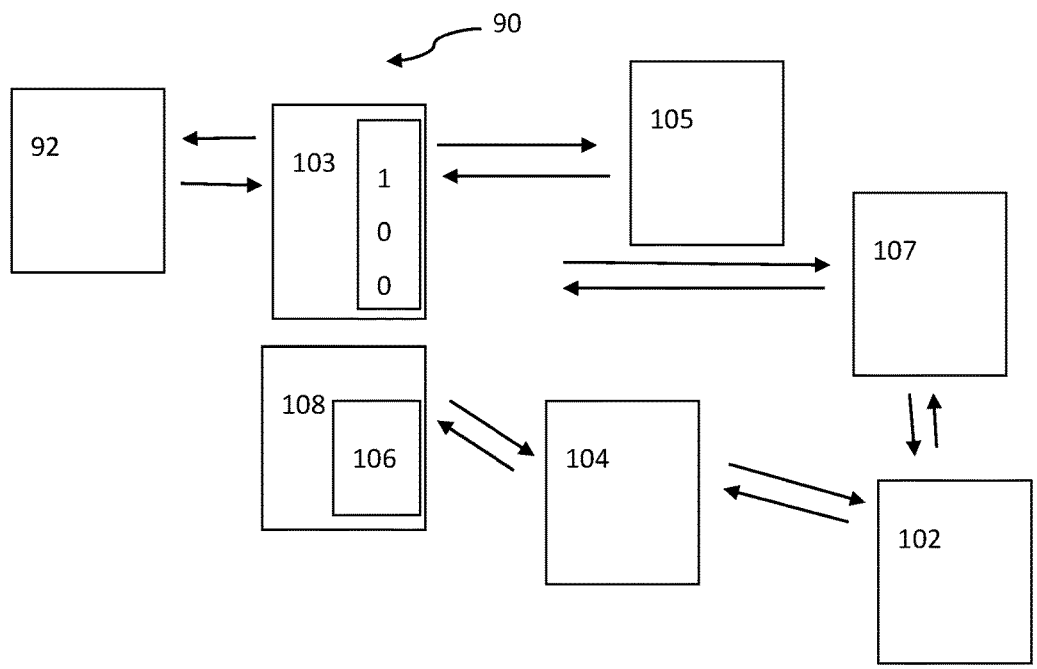
FIG. 5 is a block diagram of another embodiment of the present technology.

Another embodiment of an aircraft flight data monitoring and reporting system, generally referred to as 90, is shown in FIG. 5. The system 90 includes a flight data recording and reporting unit 92 that communicates with a mobile base station 102 via a second mobile device 103, which also provides internet access by one or more of a personal hotspot 105 and Wi-Fi access point 107 using a zero-configuration service discoverer 100. The mobile base station 102 then communicates via the internet 104, to a flight data monitoring storage and analysis unit 106, which is preferably in a cloud 108. Communication is bi-directional.

Figure 6:
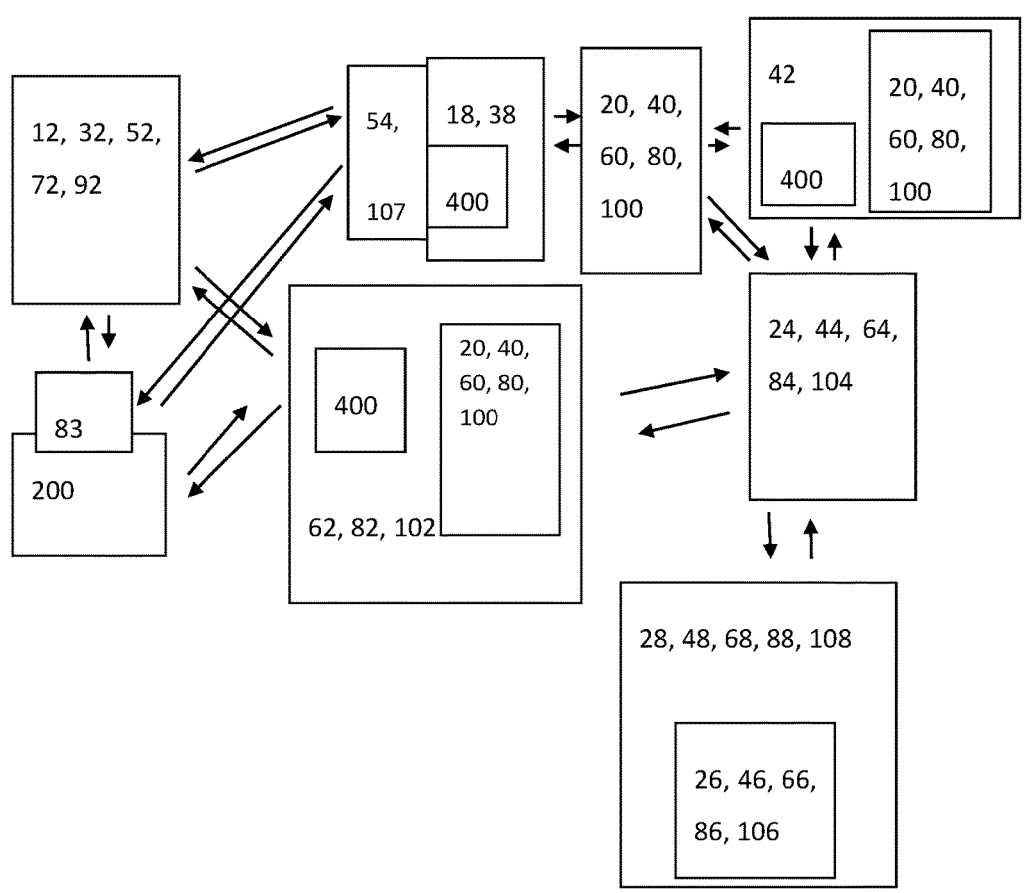
FIG. 6 is a block diagram showing data transfer.

As shown in FIG. 6, the fixed base stations 18, 38 and the mobile base stations 62, 82, 102 act as an intermediary cache, where some data processing occurs, however the main role is to safely and securely copy the flight data from the flight data recording and reporting unit 12, 32, 52, 72, 92 and send it, via the internet 24, 44, 64, 84, 104 to storage in the flight data monitoring, storage and analysis unit 26, 46, 66, 86, 106, preferably in a cloud 28, 48, 68, 88, 108. In order to do this, the fixed base station 18, 38, the mobile base stations 62, 82, 102 and optionally, the observation station 42 locate the flight data recording and reporting unit 12, 32, 52, 72, 92, they report their condition, for example, available, or uploading to another base station 18, 38, 62, 82, 102, to a user 200, the user 200 decides which flight data recording and reporting unit 12, 32, 52, 72, 92 to connect to and manually initiates a download. Once the data reaches the flight data monitoring storage and analysis unit 26, 46, 66, 86, 106, the flight log records are processed into whole flights and prepared for analysis and playback. The observation station 42 communicates with the remote flight data monitoring, storage and analysis unit 26, 46, 66, 86, 106. The fixed base station 18, 38, the mobile or fixed observation station 42 and the mobile base stations 62, 82, 102 may include a central processing unit 400, and the zero-configuration service discoverer 20, 40, 60, 80, 100. The user may use a personal hotspot 83 to assist in the data transfer.

The zero-configuration service discoverer 20 is a zero configuration multicast DNS standard (mDNS) with DNS-SD Service Discovery (Internet Engineering Task Force standard IETF RFC-6762 (mDNS). DNS-SD is IETF RFC-6763), and is collectively commonly known as Bonjour®. By adopting the zero-configuration service discoverer 20, the fixed base station 18, 38, the mobile or fixed observation station 42 and the mobile base station 62, 82, 102 auto-discover the presence of one or more flight data recording and reporting units 52, 72, 92 on the network 56 or personal hotspot 83 or second mobile device 103 that provides access with the personal hotspot 105 or Wi-Fi access point 107. This allows the base station 62, 82, 102 or mobile or fixed observation station 42 to discover the IP address that was assigned to the flight data recording and reporting unit 12, 32, 52, 72, 92. The flight data recording and reporting unit 12, 32, 52, 72, 92 does not need to know what IP address is assigned to the base station 18, 38, 62, 82, 102 or mobile or fixed observation station 42 ahead of time. This solves the problem of connecting to or creating a hotspot with an indeterminate IP address.

Note that Bonjour is only exemplary. Bonjour is Apple's implementation of Zero configuration networking (Zeroconf), a group of technologies that includes service discovery, address assignment, and hostname resolution. Bonjour locates devices such as printers, other computers, and the services that those devices offer on a local network using multicast Domain Name System (mDNS) service records. Zero configuration networking (zeroconf) is a set of techniques that automatically creates a usable Internet Protocol (IP) network without manual operator intervention or special configuration servers.

Zero configuration networking allows devices such as computers and printers to connect to a network automatically. Without zero configuration, a network administrator must set up services, such as Dynamic Host Configuration Protocol (DHCP) and Domain Name System (DNS), or configure each computer's network settings manually, which may be difficult and time-consuming. Thus, Bonjour is simply an example of a grouping of technologies to provide the foregoing technologies. The grouping may be provided as a single unit or a number of units, which together provide all the capabilities. To be clear, with these capabilities, the base station 62, 82, 102 requires no advanced knowledge of the remote flight data monitoring, storage and analysis unit 26, 46, 66, 86, 106 address.

This then allows the base station 62, 82, 102 to communicate via the internet 24, 44, 64, 84, 104 to the remote flight data monitoring, storage and analysis unit 26, 46, 66, 86, 106 providing real time FSM heuristics monitoring and real time reporting system. This also allows the base station 62, 82, 102 to act as proxy or 2-way relay unit for direct (proxy'd) communications between the remote flight data monitoring, storage and analysis unit 26, 46, 66, 86, 106 unit if desired. The algorithms used provide identification of abnormal events and cause a trigger if a condition is exceeded. The system 10 is configured to provide data collection, analysis, identification of abnormal events and triggering if a condition is exceeded for both fixed wing aircraft and helicopters.

In all embodiments, the flight data recording and reporting unit 12, 32, 52, 72, 92 is configured to monitor flight crew compliance with a set of Standard Operating Procedures adaptable to different flight operation types. It captures occurrences that take place during flight, even those which the crews are unaware of, and it identifies issues irrespective of a company's reporting culture. It provides a flexible tool for building Flight Data Monitoring (FDM) into existing avionics systems both with and without existing data monitoring appliances and includes Air Data and Attitude Heading and Reference Systems (ADHRS), Quick Access Recorder (QAR), Wireless Data Link (WDL), Read Out Subscriber Equipment (ROSE), and Flight Data Recorder (FDR). It includes FSM heuristics monitoring and a real time reporting system so that data are transmitted automatically to a local satellite transceiver, the fixed base station 18, the fixed base station 38 and the mobile or fixed observation station 42 or the mobile base station 62, 82, 102.

The flight data recording and reporting unit 12, 32, 52, 72, 92 provides multiple inputs (digital and analog and serial bus) for gathering data from sensory equipment installed in the aircraft. It is designed to perform data gathering and live event notification. Remotely configurable operating parameters allow for event message generation or control of the built in outputs when specific conditions are met based on the state of the sensory inputs. Conditions such as but not limited to, GPS position, altitude, groundspeed, accelerations (load factor), attitude (roll, pitch, yaw), heading and air data (air speed, pressure, and altitude) are monitored.

Figure 7:
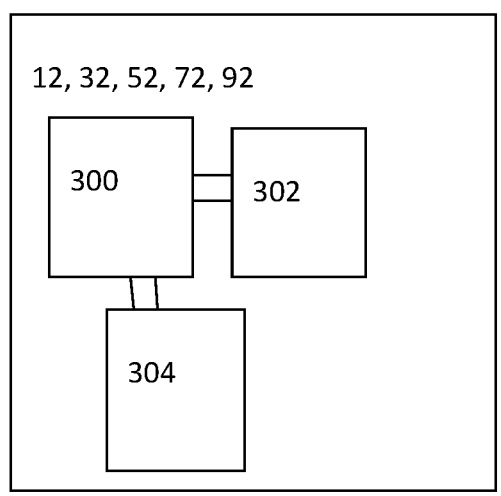
FIG. 7 is a block diagram showing the interaction between the flight data recording and reporting unit and Flight Management System Computer.

As shown in FIG. 7, in general terms, the flight data recording and reporting unit 12, 32, 52, 72, 92 may interface to a Flight Management System Computer (FMSC) 300, an input device 302 connected to the FMSC 300, and a display device 304 connected to the FMSC 300. The input device 302 may be used to load navigation information into the FMSC 300. Such information may include, for example, the latitude and longitude of various waypoints, airports, and navigational aids associated with the flight plan. The FMSC 300 may process the navigation information and forward the navigation information to the display device 304. The display device 304 may provide a visual indication of the various waypoints and airports, and the distances and headings between the waypoints, airports and navigational aids.

During a flight, the FMSC 300 may receive flight data information from the flight data recording and reporting unit 12, 32, 52, 72, 92, process the flight data information, and forward the flight data information to the display device 304 for real-time display or to another display device that is positioned in the aircraft and is directly linked to the flight data recording and reporting unit 12, 32, 52, 72, 92.

Figure 8:
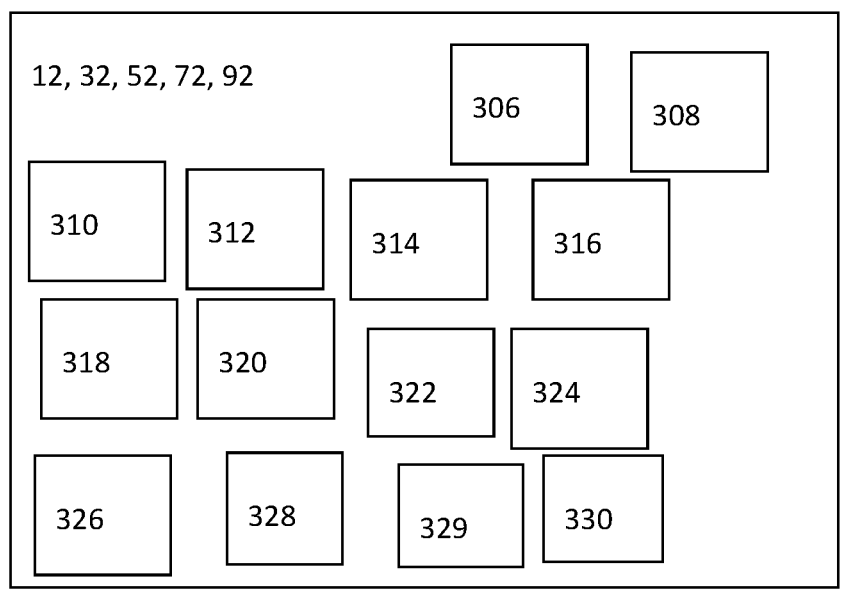
FIG. 8 is a block diagram showing the flight data recording and reporting unit of the present technology.

As shown in FIG. 8, in all embodiments, the flight data recording and reporting unit 12, 32, 52, 72, 92 more specifically includes a battery backup 306 and internal sensors to monitor the conditions including a 3-axis accelerometer 308, a 3-axis gyroscope 310, a solid-state compass 312, pitot pressure sensor 314, static pressure sensor 316, differential pressure sensor 318 and a temperature sensor 320. An inertial measurement unit (IMU) 322 capable of providing inertial loads including heading, yaw, pitch, and roll values is provided. A GPS feed 324 or an internal GPS is also provided. An internal real-time clock 326 with no main power connection is also provided. The value of the real time clock is used to timestamp all the logged data.

Internal trigger settings monitor and report internally triggered events. Thus, reports such as the following can be reported based on the data collected:

Engine cycles/engine hours;
Flight Cycles/flight hours;
Overspeed;
VSI (vertical speed indicator);
Bank angle;
Hard landing;
Height above ground (min/max);
Distance flown;
Scheduled tracking reports based on the primary reporting interval setting;
Position reports, including startup position; with a specific tag for startup as soon as it achieves a position fix after a power on condition; including Engine on/off cycles, engine hours, Flight cycles (# of take offs and landings), Flight hours, Distance flown.
Heuristic landing event report, based on the configured speed variables;
Heuristic take-off event report, based on the configured speed variables;
Elevation change report, including special reports for exceptions;
Geo fence exception report;
Stationary or lack of movement report;
Altitude report, including reporting at a Secondary Reporting Interval rate when below a specified altitude threshold. Above the altitude threshold the Primary Reporting Interval is in effect;
Data logging without transmission of position;
Emergency state reporting;
Ignition input controlled low power mode report; and
Heartbeat Mode reporting.

Other capabilities include providing Air Data and Attitude Heading and Reference Systems, Sensor telemetry and Quantitative Analysis Report generated and transmitted to remotely located stakeholders in the aircraft's operational aspects. Post mission flight visualization is also provided to remotely located stakeholders in the aircraft's operational aspects via the observation station 42, whether fixed or mobile.

Health and usage monitoring systems (HUMS) and/or Engine Trend Monitoring (ETM) is also supported. Each represent a basic data acquisition collection, analysis and sometimes onboard display system. Usually ETM and HUMS systems are very specialized to a particular aircraft and engine (powerplant) data collection for maintenance purposes, unlike FDR and FDAU equipment that are typically focused on flight safety operations. The flight data recording and reporting unit 12, 32, 52, 72, 92 bridges a gap in both aircraft maintenance and flight operations by providing a means of concentrating either or both of these specialized onboard data collection systems and facilitating the transfer of the data to the appropriate stakeholder in either real-time alerts or automated bulk data transfer. Engine data goes to an engine maintenance facility for Maintenance Operations Quality Assurance (MOQA) and flight operations data to a safety and logistics specialist department for Flight Operations Quality Assurance (FOQA).

As shown in FIG. 8, a central processor 328 of the flight data recording and reporting unit 12, 32, 52, 72, 92, has a communication protocol and handling methods that operate between it and a communications module 330 that provides the capability for bi-directional communication. The communications module can communicate to a Satcom, Wi-Fi, or USB. The architecture that controls both is internal, while the actual communication means may be internal or external. A memory 329 consisting of pre-configured instructions within the flight data recording and reporting unit 12, 32, 52, 72, 92 instructs to the central processor 328. The central processor 328 is instructed to pick the most appropriate communication medium, in other words, practices pervasive networking—it exploits multiple methods to ensure data is transferred to the appropriate stakeholder in a time appropriate manner.

The flight data recording and reporting unit 12, 32, 52, 72, 92 can be defined as a smart device, as it is able to decide when to send data and what data to send, select the data to be sent, process the data to be sent, compare data to "normal data" to identify possible anomalies, filter the data to be sent, parse the data to be sent and manipulate the data to be sent, in addition to providing the raw data. This can be autonomous or in response to instructions from the remote flight data monitoring, storage and analysis unit 26, 46, 66, 86, 106. The central processor 328 of the flight data recording and reporting unit 12, 32, 52, 72, 92 is also instructed by the memory 329 to filter and/or parse the large set of data parameters to provide a refined subset of data for sending to the base station 18, 38, 62, 82, 102 as well as the observation station 42. Communication is two way between the flight data recording and reporting unit 12, 32, 52, 72, 92 and the flight data monitoring, storage and analysis unit 26, 46, 66, 86, 106 either directly or via the base station 18, 38, 62, 82, 102 and optionally the observation station 42. This allows for instructions to be sent from the flight data monitoring, storage and analysis unit 26, 46, 66, 86, 106 to configure this parsing and reporting. This can be an iterative process, with the data set being refined or expanded or otherwise changed on board by the flight data recording and reporting unit 12, 32, 52, 72, 92, including requesting a new data set.

Wi-Fi communications between the flight data recording and reporting unit 12, 32, 52, 72, 92 and the base station 18, 38, 62, 82, 102 is inherently 2-way via TCP/IP and common networking protocols.

The base station 18, 38, 62, 82, 102 as well as the observation station 42 and the flight data monitoring storage and analysis unit 46, 66, 86, 106 are all using common TCP-based networking protocols which are all inherently 2-way.

The base station 18, 38 62, 82, 102 is an installed software application that acts as a data relay point for log files being downloaded from a flight data recording and reporting unit 12, 32, 52, 72, 92. The base station 18, 38 62, 82, 102 can be a temporary station on tablets and mobile devices for ad hoc purposes and more immediate data transfer in a limitless number of locations.

The connection between the base station 18, 38 62, 82, 102 and the flight data recording and reporting unit 12, 32, 52, 72, 92 is established via the zero-configuration automated process. Once a connection has been established, the base station 18, 38 62, 82, 102 receives the data logs from the flight data recording and reporting unit 12, 32, 52, 72, 92 and uploads them to flight data monitoring storage and analysis unit 46, 66, 86, 106 via a secured link over the public internet 24, 44, 64, 84, 104. When those files have been acknowledged as received by the data centre, the download is confirmed back to the flight data recording and reporting unit 12, 32, 52, 72, 92 and the log files are erased on the flight data recording and reporting unit 12, 32, 52, 72, 92.

To be clear, there is a requester and a listener component in the zero-configuration service discoverer 60. There is no master-slave relationship between any of the base station 18, 38 62, 82, 102, the flight data recording and reporting unit 12, 32, 52, 72, 92 and the observation station 42—each of them can perform the requester function and each of them can perform the listener function. Once a request for an IP address has been sent, and the listener hears the request, IP addresses are shared. Once the IP addresses are shared, it is arbitrary which is considered the server and which is considered the client.

The base station 18, 38 62, 82, 102 has a secondary role as an installation, configuration and maintenance tool. While connected to the flight data recording and reporting unit 12, 32, 52, 72, 92, the base station 18, 38 62, 82, 102 can be used to upload new configurations, perform IMU calibrations and even retrieve the "last line read" (ROSE functionality) from the onboard bus and other systems that the flight data recording and reporting unit 12, 32, 52, 72, 92 is recording. This may be via Wi-Fi.

More specifically, ROSE functionality is combined in the base station 18, 38 62, 82, 102 with the ability to do other service routines to the flight data recording and reporting unit 12, 32, 52, 72, 92. This is done over a Wi-Fi connection. The flight data recording and reporting unit 12, 32, 52, 72, 92 and the base station 18, 38 62, 82, 102 automates this. There is no need for maintenance personnel to attend the base station 18, 38 62, 82, 102, unless they are performing service on the flight data recording and reporting unit 12, 32, 52, 72, 92 such as firmware or configuration settings updates, or using the Last Line Read (ROSE) function.

The observation station 42 is an application for the analysis, reporting and visualization of the flight data recording and reporting unit 12, 32, 52, 72, 92 log files. The observation station 42 is a server based application (with a browser based user interface) that translates raw flight data recording and reporting unit 12, 32, 52, 72, 92 log files based on pre-configured templates, identifies flights, events and exceedances based on rules defined by the user and displays summary reports of the data and allows for full data analysis including graphing and three dimensional (3D) flight playback. Any logged data can be displayed in the observation station 42 if it can be graphed against a time series.

Figure 9:
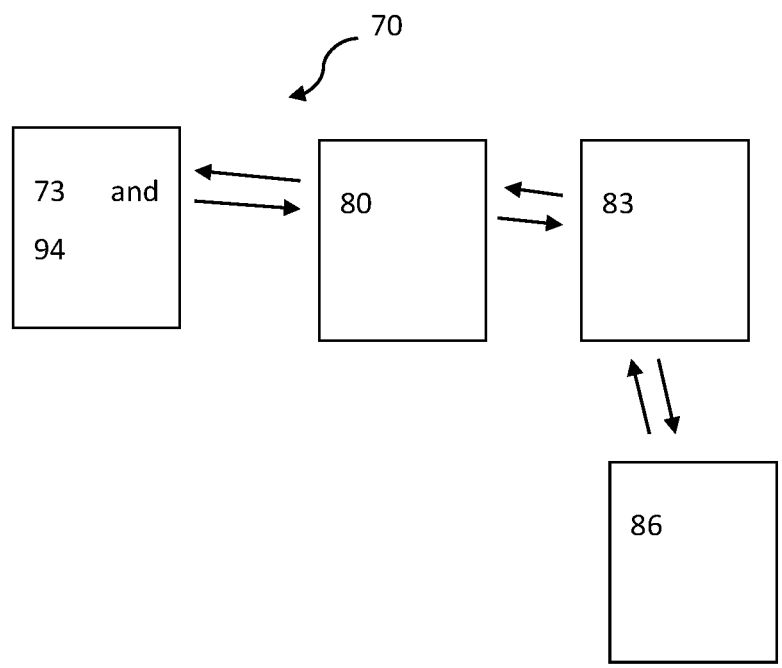
FIG. 9 is a block diagram of another embodiment of the present technology.

In one embodiment, the flight data recording and reporting unit 12, 32, 52, 72, 92 is a single unit. As shown in FIG. 9, in another embodiment, the flight data recording and reporting unit 12, 32, 52, 72, 92 is modular and is composed of two or more components that work in concert to perform the functions of a singular the flight data recording and reporting unit 12, 32, 52, 72, 92. The first component is the flight data recording and reporting unit 73 and the second and subsequent components are signal interfacing devices 94. The signal interfacing devices provide safe (isolated) paths for the flight data recording and reporting unit 12, 32, 52, 72, 92 to capture the data without affecting the signal source itself. The flight data recording and reporting unit 12, 32, 52, 72, 92 can then send raw and one or more of parsed, manipulated, selected and filtered data to the flight data monitoring, storage and analysis unit 26, 46, 66, 86, 106. It can also compare incoming data with standards and with data determined to be normal, determine exceedances, make decisions as to when to send data, respond to instructions to change standards and respond to instructions to send specific data sets, for example, parsed or manipulated or filtered data to the remote flight data monitoring, storage and analysis unit 26, 46, 66, 86, 106, while retaining all raw data. Data sampling, data analysis and data processing by the onboard flight data recording and reporting unit 26, 46, 66, 86, 106 can be recursive. The central processor 328 under control of the memory 329 provide this functionality.

While various exemplary embodiments are discussed and contemplated herein, the present disclosure provides many concepts that can be embodied in a wide variety of specific contexts. The specific embodiments discussed herein are, therefore, merely illustrative of specific ways to make and use the invention as ultimately claimed and are not meant to limit the invention in any way. Accordingly, for the ease of discussion, systems and methods for collecting, analyzing and reporting flight data embodiments are described below, as exemplary embodiments, and the description of specific exemplary embodiments is not intended to limit the exemplary embodiments disclosed herein. All methods described herein can be performed in any suitable order unless otherwise indicated herein or otherwise clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Example 1

This scenario is the most common scenario for a routine flight, returning to a home base hangar. A regularly scheduled flight lands and the pilot 200 taxis to the maintenance hangar nearby. Because data transfer is automated, the shutdown procedure does not require special steps to accommodate the offloading of the flight data from the flight data recording and reporting unit 12, 32, 52, 72, 92 installed in the aircraft to monitor strain on its airframe as well as to analyze runway approaches at the airport. The system is setup to trigger the flight data recording and reporting unit 12, 32, 52, 72, 92 to commence uploading its data.

The aircraft is stopped at the hangar. The flight data recording and reporting unit 12, 32, 52, 72, 92 connects to the Wi-Fi network 56, with an SSID and a pass-phrase. The wireless communication link (Wi-Fi access point) 54 (see FIG. 6) is mounted near to the hangar and so the signal is strong. The flight data recording and reporting unit 12, 32, 52, 72, 92 connects and then attempts to open a connection to a base station 62, 82, 102. The base station 62, 82, 102 is online and the flight data recording and reporting unit 12, 32, 52, 72, 92 connects to it. The flight data recording and reporting unit 12, 32, 52, 72, 92 follows a protocol and begins uploading its flight log to the base station 62, 82, 102.

The pilot 200 is keen to examine his approach at the airport on the last leg. He wants to verify that the flight data recording and reporting unit 12, 32, 52, 72, 92 is uploading to the base station 62, 82, 102. The pilot 200 takes out his mobile device, which in this case is an iPhone®, checks that its Wi-Fi is connected to the appropriate network, which it is, and taps on the mobile base station application to open a mobile base station 62, 82, 102 or mobile or fixed observation station 42. Within a few seconds of the application launch, it lists two flight data recording and reporting unit 12, 32, 52, 72, 92 on the network. One is labeled as his aircraft. He sees that its status is 'Uploading'. He continues to monitor the application. In a moment, the status of the flight data recording and reporting unit 12, 32, 52, 72, 92 changes from 'Uploading' to 'Upload Complete'. The flight data recording and reporting unit 12, 32, 52, 72, 92 has finished uploading the data and it will soon be available on the remote flight data monitoring, storage and analysis unit 26, 46, 66, 86, 106 web application for analysis and flight playback.

Example 2

The pilot 200 was asked to pilot a charter flight to a temporary airstrip. Staff are required to download the flight data monitoring records after each flight. After the flight, the pilot 200 lands the aircraft and taxis to a stop on the dirt runway. After the passengers exit the aircraft, the pilot 200 takes out his mobile device, which in this case is an iPad®, to use as the mobile base station 62, 82, 102 to retrieve the flight data from the onboard flight data recording and reporting unit 12, 32, 52, 72, 92.

There is no Wi-Fi network in the area, but there is a strong LTE cellular data network. The pilot 200 creates a personal hotspot 83 Wi-Fi access point using his iPad, by first setting his iPad name to the SSID needed for the onboard flight data recording and reporting unit 12, 32, 52, 72, 92 to communicate and sets the Wi-Fi hotspot pass-phrase to the appropriate pass-phrase.

He then taps on the mobile base station application to open a mobile base station 62, 82, 102. The pilot 200 can view the onboard flight data recording and reporting unit 12, 32, 52, 72, 92 information on the iPad. The onboard flight data recording and reporting unit 12, 32, 52, 72, 92 has a status of 'Ready'—meaning it can be connected to download flight logs. The pilot 200 taps on the mobile base station 62, 82, 102 and selects the command to download its flight data. The application runs the download. As it is downloading, it is also uploading to the Internet-based flight data monitoring storage and analysis unit, 66, 86, 106.

Thereafter, the transfer completes, the pilot 200 turns off the personal hotspot on his iPad and shuts down the iPad mobile base station application. He completes the aircraft shutdown procedure.

Later, the pilot uses a Wi-Fi Internet connection as his wireless communication link 54 to view the flight data log. He logs into the flight data monitoring storage and analysis unit 26, 46, 66, 86, 106 web application from his iPad's web browser and views the report of his last flight.

Example 3

The following are the steps taken in the most common scenario:

The aircraft lands, taxis to the hangar and stops. The aircraft door opens, or park brake is applied and this triggers the onboard flight data recording and reporting unit 12, 32, 52, 72, 92 to connect to a base station 62, 82, 102 and uploads its flight log (payload).

1. The onboard flight data recording and reporting unit 12, 32, 52, 72, 92 detects the Wi-Fi network 16, 36, 56, sees that it matches the SSID it wants and signs into the network using the WPA2 pass-phrase it has. An IP address is assigned to the onboard flight data recording and reporting unit 12, 32, 52, 72, 92.
2. The onboard flight data recording and reporting unit 12, 32, 52, 72, 92 follows mDNS protocol to establish a local link host name for it.
3. The onboard flight data recording and reporting unit 12, 32, 52, 72, 92 sends a Bonjour registration. Its UDP status service port is available to receive requests.
4. The onboard flight data recording and reporting unit 12, 32, 52, 72, 92 sends a multicast 'busy' status on the network using UDP port matching the service port, above.
5. It now attempts to connect to the preconfigured base station server (IP-address, port). It successfully connects then initiates upload of its flight records to the base station 62, 82, 102.
6. Meanwhile, it is servicing any UDP requests for its status, accepting UDP request on the service port it registered.
7. The upload completes, and so the onboard flight data recording and reporting unit 12, 32, 52, 72, 92 sends a multicast status update, closes the connection to the base station 62, 82, 102.
8. It then creates a mobile base station socket service, and registers this service with Bonjour.
9. The onboard flight data recording and reporting unit 12, 32, 52, 72, 92 sends a multicast of its status and then waits for a timeout period for new any new client connection. None are received, so the onboard flight data recording and reporting unit 12, 32, 52, 72, 92 shuts down.

Alternative Flows:

i) In Step 5, the onboard flight data recording and reporting unit 12, 32, 52, 72, 92 could not connect to the base station server. It then skips to step 8.
ii) In Step 5, the onboard flight data recording and reporting unit 12, 32, 52, 72, 92 didn't have an optionally set IP address and port number for a base station configured—it skips to step 8.

Example 4

In another scenario, the aircraft lands and a user 200 wishes to perform manual request to offload the onboard flight data recording and reporting unit 12, 32, 52, 72, 92 flight data logs. The user uses a mobile base station 62, 82, 102 connected to the local Wi-Fi access point 54, 107 (see FIG. 6). The aircraft may be at a remote airstrip and the operators wish to examine the flight logs, and don't have a regular base station nearby.

In this 'zero' configuration scenario, the user 200 starts up a mobile edition of the base station 62, 82, 102 on a mobile device, such as iPad, iPhone or Android® phone or tablet. To prevent unauthorized access, the mobile base station 62, 82, 102 requires that the user 200 had successfully authenticated through the service provider's Internet services 64, 84, 104, and will cache the credentials.

The steps are the same as previously described, except when it gets to Step 5, the onboard flight data recording and reporting unit 12, 32, 52, 72, 92 will fail to connect to the main base station 18 so the onboard flight data recording and reporting unit 12, 32, 52, 72, 92 skips down to step 8:

1. When the user 200 launches the mobile base station 62, 82, 102, it starts looking for a Bonjour service on the network 56. It sees that the onboard flight data recording and reporting unit 12, 32, 52, 72, 92 has registered itself with Bonjour. The application presents this onboard flight data recording and reporting unit 12, 32, 52, 72, 92 to the user in a list of possible onboard flight data recording and reporting units 52, 72, 92 present on the local area network 56.
2. The application, behind the scenes, has not only detected the presence of the onboard flight data recording and reporting unit 12, 32, 52, 72, 92, but using the now known UDP/IP address and Port number, the mobile base station application makes a user datagram request for the status of the onboard flight data recording and reporting unit 12, 32, 52, 72, 92.
3. The onboard flight data recording and reporting unit 12, 32, 52, 72, 92 receives the status request, and issues a UDP multicast of its status, as "ready".
4. The mobile base station 62, 82, 102 displays the updated status on the application, and then the user 200 initiates a request to download the onboard flight data recording and reporting unit 12, 32, 52, 72, 92 flight data. The mobile base station 62, 82, 102 had looked up the Bonjour service registration for this onboard flight data recording and reporting unit 12, 32, 52, 72, 92 to know how to connect to its TCP socket.
5. The onboard flight data recording and reporting unit 12, 32, 52, 72, 92 accepts the single TCP/IP socket connection. When the mobile base station 62, 82, 102 has completed the tasks, it closes the connection to the onboard flight data recording and reporting unit 12, 32, 52, 72, 92. It closes the connection to the cloud storage when it has completed pushing the flight log files up to the flight data monitoring storage and analysis unit 26, 46, 66, 86, 106 in the cloud storage service 68, 88, 108.

Alternative Flow:

I. In Step 4, the onboard flight data recording and reporting unit 12, 32, 52, 72, 92 times out waiting for a TCP/IP client to connect to it, having broadcasted via Bonjour its service availability. It times out and shuts down.

II. In Step 2, the mobile station 62, 82, 102 fails to find any available onboard flight data recording and reporting units 52, 72, 92 on the network 56. It doesn't display any to the user. The user quits the application.

Example 5

In this scenario, the user 200 will download the onboard flight data recording and reporting unit 12, 32, 52, 72, 92 flight data using a personal hotspot 83, 105, 107 Wi-Fi network. No Wi-Fi network with the organization's known Wi-Fi network SSID is available nearby, either because it's not physically there, or is shutdown. The user wants to send the onboard flight data recording and reporting unit 12, 32, 52, 72, 92 data and put it up into the flight data monitoring storage and analysis unit 26, 46, 66, 86, 106 in the cloud storage 68, 88, 108 for analytical processing.

6. The aircraft taxis in and terminates the flight. The onboard flight data recording and reporting unit 12, 32, 52, 72, 92 is triggered to attempt to offload its data collected.
7. The onboard flight data recording and reporting unit 12, 32, 52, 72, 92 first establishes connectivity to the Wi-Fi network 56 it is configured to connect to. In this case it does not yet see any Wi-Fi networks 56 available. It waits for a set period, scanning for Wi-Fi networks 56.
8. The user 200 of the mobile base station 62, 82, 102 configures a mobile device SSID to match the preconfigured SSID that the onboard flight data recording and reporting unit 12, 32, 52, 72, 92 is configured with. The user 200 then sets the password to match the preconfigured password for that network.
9. The user 200 turns on the personal hotspot 83, 105, 107 Wi-Fi network 56 on their mobile device.
10. The onboard flight data recording and reporting unit 12, 32, 52, 72, 92 now detects the Wi-Fi network 56, sees that it matches what it wants and logs into the network. An IP address is assigned to the onboard flight data recording and reporting unit 12, 32, 52, 72, 92.
11. At this point the flow follows the same as previous use-cases. Only this time, there will be no main base station 18 available, but the onboard flight data recording and reporting unit 12, 32, 52, 72, 92 does not know that and follows normal path.
12. Next, the onboard flight data recording and reporting unit 12, 32, 52, 72, 92 uses mDNS protocol to establish a local link host name for it.
13. The onboard flight data recording and reporting unit 12, 32, 52, 72, 92 sends a Bonjour registration for its UDP status service port.
14. The onboard flight data recording and reporting unit 12, 32, 52, 72, 92 multicasts a 'busy' status on the network using UDP port matching the service port, above.
15. The onboard flight data recording and reporting unit 12, 32, 52, 72, 92 attempts to connect to the main base station (fixed base station) 18, but attempts to connect fail.
16. The onboard flight data recording and reporting unit 12, 32, 52, 72, 92 creates a server socket to accept a single client, and then the onboard flight data recording and reporting unit 12, 32, 52, 72, 92 registers its service name with a service type base, setting up the port and hostname in the Bonjour registration.
17. Next, the user 200 runs the mobile base station 62, 82, 102 application.
18. The mobile base station 62, 82, 102 application interrogates the local network 56 looking for flight dmp service types.
19. It sees the onboard flight data recording and reporting unit 12, 32, 52, 72, 92. It sends a UDP status request to the onboard flight data recording and reporting unit 12, 32, 52, 72, 92, and displays the onboard flight data recording and reporting unit 12, 32, 52, 72, 92 and its status to the user 200.
20. The onboard flight data recording and reporting unit 12, 32, 52, 72, 92 responds that it is "ready", perhaps providing details of size of data stored not yet retrieved.
21. The user 200 selects to download the data from the onboard flight data recording and reporting unit 12, 32, 52, 72, 92. It connects to the TCP service port of the onboard flight data recording and reporting unit 12, 32, 52, 72, 92 and issues commands to commence download. The onboard flight data recording and reporting unit 12, 32, 52, 72, 92 multicasts a 'busy' status on its UDP service port.
22. The download completes and the mobile base station 62, 82, 102 closes the connection to the onboard flight data recording and reporting unit 12, 32, 52, 72, 92.
23. The onboard flight data recording and reporting unit 12, 32, 52, 72, 92 multicasts a 'ready' status. It then waits for a time period for any new service requests; otherwise shuts down.

Example 6

In this scenario, the onboard flight data recording and reporting unit 12, 32, 52, 72, 92 fails to reach any base station and shuts down after attempting connection after a period of time.
24. The onboard flight data recording and reporting unit 12, 32, 52, 72, 92 successfully connects to a Wi-Fi network with matching SSID, using the correct WPA2 pass phrase. It is dynamically assigned an IP address.
25. The onboard flight data recording and reporting unit 12, 32, 52, 72, 92 sets up its mDNS entries—first setting up its hostname local-link entry then registering its UDP Bonjour Service.
26. It then broadcasts itself on the network, its 'ready' status—announcing its presence (this is the requestor function). However, no mobile base station clients are attempting to connect to the onboard flight data recording and reporting unit 12, 32, 52, 72, 92 (there is no listener).
27. After a timeout period, the onboard flight data recording and reporting unit 12, 32, 52, 72, 92 shuts down having not had a client mobile base station connect to it.

Example 7

In this scenario the aircraft is in flight and an onboard sensor or signal triggers a threshold exceedance to or within the flight data recording and reporting unit 12, 32, 52, 72, 92. The flight data recording and reporting unit 12, 32, 52, 72, 92 then issues an alert or event message to the Satcom and/or satellite communications device (wireless communication link 14, 15) to relay this information to the remote flight data monitoring, storage and analysis unit 26, 46, 66, 86, 106 optionally via the base station 18, 38, 62, 82, 102. The remote flight data monitoring, storage and analysis unit 26, 46, 66, 86, 106 can in turn automatically notify all stakeholders in the aircrafts operation. Total latency for this process is measured in the seconds regardless of location of the aircraft and the stakeholder(s).

Example 8

Similar to example 7, however the remote stakeholder may be a maintenance person that requires further information about the exceedance event he/she just received. This person can issue a special request back through the remote flight data monitoring, storage and analysis unit 26, 46, 66, 86, 106 via the satcom (wireless communication link 14, 15) (FIG. 1) and to the flight data recording and reporting unit 12, 32, 52, 72, 92. The flight data recording and reporting unit 12, 32, 52, 72, 92 then fulfils the remote (Mobile Terminated) request by creating a new message with the additional details and sends it back to the satcom (wireless communication link 14, 15) to relay back to the requesting person.

Example 9

In this scenario the aircraft is in flight and the onboard sensors are providing data at intervals throughout the flight. Snapshot data are also collected and sent when the engines are at take-off power. The sensors are sending the data to the flight data recording and reporting unit 12, 32, 52, 72, 92 which may be a two component (elements 73 and 94) unit. The flight data recording and reporting unit 12, 32, 52, 72, 92 then extracts engine and air data from this flight data, formats it and sends it to the remote flight data monitoring, storage and analysis unit 26, 46, 66, 86, 106 for the purpose of Engine Trend Analysis and Fault & Failure prediction and identification. The remote flight data monitoring, storage and analysis unit 26, 46, 66, 86, 106 may request a different data set from the flight data recording and reporting unit 12, 32, 52, 72, 92. This may be an iterative process, with the remote flight data monitoring, storage and analysis unit 26, 46, 66, 86, 106 repeatedly requesting a different data set from the flight data recording and reporting unit 12, 32, 52, 72, 92. Each request results in the flight data recording and reporting unit 12, 32, 52, 72, 92 manipulating the data prior to sending it. Data collected includes compressor/turbine RPMs and engine gas temperature. Secondary parameters collected are fuel flow, engine vibration, oil temperature and pressure, torque and propeller or rotor rpm if appropriate. Air data consists of pressure, altitude, outside air temperature and indicated airspeed. The data may or may not be routed via the base station 18, 38 62, 82, 102 enroute to the remote flight data monitoring, storage and analysis unit 26, 46, 66, 86, 106. The raw data are also sent to the remote flight data monitoring, storage and analysis unit 26, 46, 66, 86, 106.

Example 10

In this scenario, an engine manufacturer or maintenance provider requires periodic snapshots of certain specified data parameters that are to be collated and sent to them as part of their operational performance obligation. The flight data recording and reporting unit 12, 32, 52, 72, 92 manages this by:
1. Collecting the incoming data and analyzing it to verify that it is representative of "stabilized" data according to some preset (known) profile within the flight data recording and reporting unit 12, 32, 52, 72, 92.
2. If data are not stable the flight data recording and reporting unit 12, 32, 52, 72, 92 waits for time t, and tries again.
3. If data are stable, flight data recording and reporting unit 12, 32, 52, 72, 92 begins collecting the specific required parameters for time period=y.
4. The flight data recording and reporting unit 12, 32, 52, 72, 92 then reformats the collected data ready for transmission.
5. The flight data recording and reporting unit 12, 32, 52, 72, 92 analyses the data and determines whether it is important enough to send it immediately while airborne and by satellite radio or wait until the aircraft has completed flight i.e. on ground and then relay the data set along with other (bulk) stored data to the remote flight data monitoring, storage and analysis unit 26, 46,

66, 86, 106. This latter step is often referred to as the timeliness determination of information.

Example 11

In this scenario, the aircraft data collected by the flight data recording and reporting unit 12, 32, 52, 72, 92 indicates an engine has failed and altitude is rapidly decreasing. The determination of this state is done as an iterative process between the source sensors (included but not limited to Engine parameters, GPS, Attitude and Heading Reference System (AHRS), etc.) and the flight data recording and reporting unit 12, 32, 52, 72, 92 i.e. new data must be compared with old data (data determined to represent a normal flight) to validate the data. The resulting analysis and action are a report that is formatted to be transmitted to the remote flight data monitoring, storage and analysis unit 26, 46, 66, 86, 106 indicating that a crash (unintended and/or limited controlled landing into the terrain) is imminent. This is also an example of timeliness determination of information.

Example 12

In this scenario the aircraft is in flight and the onboard sensors are providing data at intervals throughout the flight. The remote flight data monitoring, storage and analysis unit 26, 46, 66, 86, 106 sends instructions to the flight data recording and reporting unit 12, 32, 52, 72, 92 to modify the heuristics triggering conditions via WIFI, satellite or network link. Triggering condition examples are:
Engine temperature over X degrees (for example, but not limited to 950) for more than Y second (for example, but not limited to 5 seconds), send alert message with duration over limit, peak value and time of occurrence.
When retardant tank doors open, send tank level.
When tank doors close, send tank level.
Engine torque over 105% for more than two seconds, send alert message with duration over limit, peak value and time of occurrence.

Example 13

In this scenario aerial fire attack data are reported. The flight data recording and reporting unit 12, 32, 52, 72, 92 reports the time and location of a drop start and drop end to the remote flight data monitoring, storage and analysis unit 26, 46, 66, 86, 106. At the end of a drop the flight data recording and reporting unit 12, 32, 52, 72, 92 calculates the quantity of retardant dropped and reports this along with the drop pattern and selected flow rate if available, again to the remote flight data monitoring, storage and analysis unit 26, 46, 66, 86, 106.

Example 14

In this scenario, the flight data recording and reporting unit 12, 32, 52, 72, 92 monitors operational status updates including fault alarms for onboard, secondary, not-required-for-flight electronic systems. These are signals by the electronics systems that are monitored, analyzed and relayed by the flight data recording and reporting unit 12, 32, 52, 72, 92. An example of this is monitoring the passenger movie and entertainment system for commercial aircraft. Typically, this is a self-contained system that is managed by the flight attendants. There are a limited number of functions available to the flight attendants such as start/stop and reset. An in-flight failure that a simple system reset cannot remedy is disruptive to the passengers' expectations and experience. More complex adjustments/repairs must be performed when the aircraft is on ground and at the gate and may require additional specialized training or personnel which may take several flight legs before coordination of a fix is done.

The flight data recording and reporting unit 12, 32, 52, 72, 92 continuously monitors and reports of the functional state of the system to ground-based stakeholders in that can take appropriate action. The flight data monitoring and reporting unit communicates bi-directionally with the remote flight data monitoring, storage and analysis unit 26, 46, 66, 86, 106. The communication may include the ground stakeholder sending commands to the aircraft via the flight data recording and reporting unit 12, 32, 52, 72, 92 which relays the commands to the in-flight entertainment (IFE) system to reset or otherwise modify its configuration settings. In a second scenario, the flight data recording and reporting unit 12, 32, 52, 72, 92 sends a status message to the ground stakeholder that the IFE is non-responsive, then the ground stakeholder issue a message to the flight data recording and reporting unit 12, 32, 52, 72, 92 to reset the IFE unit—either by a soft command or hard reset. Doing so saves time, costs and improves customer relationships for the airline by saving the flight attendants efforts from this maintenance task, and further improves the efficiency of scheduling gate-based repairs if required.

Example 15

In this scenario, the flight data recording and reporting unit 12, 32, 52, 72, 92 monitors the fuel state of the aircraft (quantity and rate of consumption), alerting on low quantity or abnormally high consumption rate. The flight data recording and reporting unit 12, 32, 52, 72, 92 continuously records the fuel flow rate into the engines and the total fuel quantity in the aircraft tanks. The flight data recording and reporting unit 12, 32, 52, 72, 92 analyses the data and determines whether it is important enough to send it immediately or send fuel flow and quantity data periodically to the to the remote flight data monitoring, storage and analysis unit 26, 46, 66, 86, 106 where it can be viewed by a dispatcher and cross checked against the planned fuel use and the required reserves. Abnormal fuel use can be flagged for investigation. Fuel use data can be used to identify operational improvements that may reduce use, resulting in cost savings to the operator.

Example 16

In this scenario, the flight data recording and reporting unit 12, 32, 52, 72, 92 monitors the flight data continuously for abnormal events by matching the pre-defined triggers of Example 12, then captures and transmits a pre-defined time-slice of a portion of the flight data parameters when trigger conditions are met. When an abnormal event occurs, the flight data recording and reporting unit 12, 32, 52, 72, 92 collects a snapshot of the data around the event (for example one minute before and after) and transmit that to the flight data monitoring, storage and analysis unit 26, 46, 66, 86, 106 for analysis. The flight data recording and reporting unit 12, 32, 52, 72, 92 can filter the flight data that is transmitted to certain subsets, such as acceleration data, engine data, flight controls or position and orientation.

Example 17

In this scenario, a user requires further information than was sent in Example 16. The user commands the flight data monitoring, storage and analysis unit 26, 46, 66, 86, 106 to request the flight data recording and reporting unit 12, 32, 52, 72, 92 send a specific data set collected at a specific time to the flight data monitoring, storage and analysis unit 26, 46, 66, 86, 106 for analysis. The flight data recording and reporting unit 12, 32, 52, 72, 92 retrieves the data from its memory, filters and/or parses it then transmits it to the flight data monitoring, storage and analysis unit 26, 46, 66, 86, 106.

Example 18

In this scenario, the flight data recording and reporting unit 12, 32, 52, 72, 92 monitors the fluid state of tanks on the aircraft (for example, but not limited to firefighting fluid tanks) (quantity and rate of consumption), alerting on change rate. The flight data recording and reporting unit 12, 32, 52, 72, 92 continuously records the release rate and the total volume in the tanks. Abnormal fluid use can be flagged for investigation. Fluid use data can be used to identify operational improvements that may increase efficiency, reduce use, resulting in cost savings to the operator. Fluid use data can also be used to verify fluid was deposited in the correct location and the correct quantity.

Advantages of the exemplary embodiments described herein may be realized and attained by means of the instrumentalities and combinations particularly pointed out in this written description. It is to be understood that the foregoing general description and the following detailed description are exemplary and explanatory only and are not restrictive of the claims below. While example embodiments have been described in detail, the foregoing description is in all aspects illustrative and not restrictive. It is understood that numerous other modifications and variations can be devised without departing from the scope of the example embodiment.

While example embodiments have been described in connection with what is presently considered to be an example of a possible, most practical and/or suitable embodiment, it is to be understood that the descriptions are not to be limited to the disclosed embodiments, but on the contrary, are intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. An aircraft flight data monitoring and analysis system, the system comprising: an onboard flight data recording and reporting unit, which includes a central processor and a memory, the memory configured to send instructions to the central processor to analyze a data set and then process the data set by one or more of parsing, filtering, selecting a subset of the data set and manipulating the data set prior to sending the data set or the subset of the data set, wherein the onboard flight data recording and reporting unit is configured to provide flight data monitoring; at least one signal interfacing device, which may be integrated in the onboard flight data recording and reporting unit or may be separate to and in communication with the onboard flight data recording and reporting unit; a remote flight data monitoring, storage and analysis unit; a Satcom (satellite communication) link for transfer of data from the onboard flight data recording and reporting unit and the remote data monitoring, storage and analysis unit; Wi-Fi a network and an internet network, wherein the Wi-Fi and the internet network are for transfer of data to and from the onboard data recording and reporting unit and the remote flight data monitoring, storage and analysis unit; and a base station, which is a software application, the software application configured to copy and cache data from the onboard flight data recording and reporting unit and relay the cached data to the remote flight data monitoring, storage and analysis unit.

2. The system of claim 1, wherein the onboard flight data recording and reporting unit is further configured to provide onboard, secondary, not-required-for-flight data.

3. An onboard flight data recording and reporting unit for use in an aircraft flight data monitoring and analysis system, the unit comprising a central processor and a memory, the central processor comprising a communication protocol and handling methods that operate between it and a communications module to facilitate bi-directional communication between the flight data recording and reporting unit and an aircraft flight data monitoring, storage and reporting system and the memory configured to send instructions to the central processor to analyze a data set and then process the data set by one or more of parsing, filtering, selecting a subset of the data set and manipulating the data set prior to sending the data set or the subset of the data set.

4. The onboard flight data recording and reporting unit of claim 3, the unit configured to provide flight data monitoring.

5. The onboard flight data recording and reporting unit of claim 4 further comprising a battery backup, a 3-axis accelerometer, a 3-axis gyroscope, a solid-state compass, pitot pressure sensor, static pressure sensor, differential pressure sensor, a temperature sensor, an inertial measurement unit, a Global Positioning Satellite (GPS) feed or an internal GPS, and an internal real-time clock.

6. The onboard flight data recording and reporting unit of claim 5, further comprising Finite State Machine heuristics monitoring and a real time reporting system.

7. The onboard flight data recording and reporting unit of claim 6, further configured to provide onboard, secondary, not-required-for-flight data.

8. A method of recording and reporting aircraft data, the method comprising:
    selecting an onboard flight data recording and reporting unit, which includes a central processor and a memory, the memory configured to send instructions to the processor;
    selecting a plurality of signal interfacing device, each in communication with the onboard flight data recording and reporting unit and each in communication with a single sensor;
    the onboard flight data recording and reporting unit receiving raw data from each signal interfacing device;
    the onboard flight data recording and reporting unit recording the raw data;
    the onboard flight data recording and reporting unit analyzing the raw data and processing the raw data by one or more of parsing, filtering, selecting a subset of the raw data and manipulating the raw data to provide analyzed and processed data; and
    the onboard flight data recording and reporting unit reporting the raw data and the processed data to a remote flight data monitoring, storage and analysis unit.

9. The method of claim 8, wherein the reporting is autonomous.

10. The method of claim 9, further comprising the onboard flight data recording and reporting unit determining an appropriate time for reporting the processed data.

11. The method of claim 9, further comprising the onboard flight data recording and reporting unit receiving instructions from the remote flight data monitoring, storage and analysis unit.

12. The method of claim 11, further comprising the onboard flight data recording and reporting unit reprocessing the raw data or the processed data in response to the instructions from the remote flight data monitoring, storage and analysis unit.

13. The method of claim 12, wherein the raw data are flight data.

14. The method of claim 11, wherein the raw data are aerial fire attack data.

15. The method of claim 11, wherein the raw data are onboard, secondary, not-required-for-flight data.

16. The method of claim 11, further comprising the onboard flight data recording and reporting unit communicating with an observation station.

17. The method of claim 16, further comprising the observation station providing post mission flight visualization.

18. An aircraft flight data monitoring and analysis system, the system comprising: at least one onboard aircraft sensor; an onboard flight data recording and reporting unit, which includes a central processor and a memory, the memory configured to send instructions to the central processor to analyze a data set and then process the data set by one or more of parsing, filtering, selecting a subset of the data set and manipulating the data set prior to sending the data set or the subset of the data set, wherein the onboard flight data recording and reporting unit is configured to provide flight data monitoring; at least one signal interfacing device in communication with the onboard aircraft sensor and the onboard flight data recording and reporting unit, and which may be integrated in the onboard flight data recording and reporting unit or may be separate to the onboard flight data recording and reporting unit; a remote flight data monitoring, storage and analysis unit; a Satcom (satellite communication) link for transfer of data from the onboard flight data recording and reporting unit and the remote data monitoring, storage and analysis unit; and Wi-Fi a network and an internet network, wherein the Wi-Fi and the internet network are for transfer of data to and from the onboard data recording and reporting unit and the remote flight data monitoring, storage and analysis unit.

* * * * *